(12) United States Patent
Tsuji et al.

(10) Patent No.: US 6,459,594 B1
(45) Date of Patent: Oct. 1, 2002

(54) SWITCHING POWER SUPPLY APPARATUS AND METHOD

(75) Inventors: Hitoshi Tsuji; Eito Moromizato, both of Machida (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/598,617

(22) Filed: Jun. 21, 2000

(30) Foreign Application Priority Data

Jul. 2, 1999 (JP) ............................................ 11-189022

(51) Int. Cl.[7] ........................ H02M 3/335; H01H 47/00
(52) U.S. Cl. .................................... 363/21.08; 307/125
(58) Field of Search .............................. 363/21, 20, 97, 363/98, 127, 132; 323/222, 285; 307/125, 130

(56) References Cited

U.S. PATENT DOCUMENTS

| | | | | |
|---|---|---|---|---|
| 4,172,276 A | * | 10/1979 | Kameya | 363/19 |
| 4,467,406 A | * | 8/1984 | Hattori et al. | 363/19 |
| 5,008,794 A | * | 4/1991 | Leman | 363/56 |
| 5,140,511 A | * | 8/1992 | Lee et al. | 363/21.07 |
| 5,424,933 A | * | 6/1995 | Illingworth | 363/56 |
| 5,901,051 A | * | 5/1999 | Takahashi et al. | 363/21 |
| 5,903,447 A | * | 5/1999 | Takahashi et al. | 363/21 |

* cited by examiner

*Primary Examiner*—Rajnikant B. Patel
(74) *Attorney, Agent, or Firm*—Ostrolenk, Faber, Gerb & Soffen, LLP

(57) ABSTRACT

A switching power supply apparatus has a transformer having a primary winding, a secondary winding and a tertiary winding; a primary switching element connected to the primary winding of the transformer for providing the primary winding with an input voltage in accordance with an on-off operation of the main switching element; an output circuit connected to the secondary winding of the transformer for receiving a voltage based on the input voltage from the secondary winding, rectifying the voltage and outputting an output voltage; a detection circuit in which the output voltage output from the output circuit is indirectly detected using the tertiary winding, and the detected voltage is output; a compensating-voltage-superposition circuit which generates a compensating voltage, in accordance with the detection voltage, for compensating a deviation of the detection voltage of the detection circuit to the output voltage of the output circuit in accordance with a change of the input voltage and which superposes the compensating voltage on the detection voltage output from the detection circuit; and a control circuit which controls the on-off operation of the primary switching element so that the output voltage of the output circuit is stabilized based on the detection voltage having the compensating voltage superposed thereon.

13 Claims, 9 Drawing Sheets

SWITCHING POWER SUPPLY APPARATUS AND METHOD

BACKGROUND OF THE INVENTION

1. Field of the Invention

The present invention relates to a switching power supply apparatus provided with a converter, such as a DC-DC converter or an AC-DC converter.

2. Description of the Related Art

FIG. 9 shows an example of a circuit construction of a converter which is a basic circuit element of a conventional switching power supply apparatus. The converter shown in FIG. 9 is an isolated and has a transformer 1 therein. A primary winding N1 of the transformer 1 is connected to a primary circuit 2 while a secondary winding N2 thereof is connected to a secondary circuit (output circuit) 3.

The primary circuit 2 includes a primary switching element Q (a MOS-FET in the example shown in FIG. 9) and a resistor 4 and has an input thereof connected to an input power supply 5. The secondary circuit 3 includes diodes 6 and 7, a choke inductor 8, and a smoothing capacitor 10 and has output terminals 3a and 3b thereof connected to a load (not shown). The direct-current input voltage Vin of the input power supply 5 is applied across the primary winding N1 of the transformer 1 in accordance with on-off operations of the primary switching element Q, and an output voltage is produced from the secondary winding N2 in accordance with the input voltage Vin. This output voltage from the secondary winding N2 is rectified and smoothed by the secondary circuit 3, and a direct-current voltage Vout is applied across the load.

As shown in FIG. 9, the gate of the primary switching element Q is connected to a control circuit 11. A tertiary winding N3 is provided in the transformer 1, and this tertiary winding N3 is connected to a detection circuit 12. This detection circuit 12 includes diodes 13 and 14, a choke inductor 15 and a smoothing capacitor 16. These circuit elements form the same circuit as the secondary circuit 3. Since a voltage substantially corresponding to a voltage generated across the secondary winding N2 is generated across the tertiary winding N3, the voltage across the tertiary winding N3 is rectified and smoothed by the same type circuit as the secondary circuit 3, whereby a voltage corresponding to the output voltage Vout of the secondary circuit 3 is generated across the smoothing capacitor 16. In addition to the above construction, the detection circuit 12 includes a diode 17 and voltage-dividing resistors 18 and 19. The voltage across the smoothing capacitor 16 is voltage-divided by the voltage-dividing resistors 18 and 19, and the divided voltage is applied as a detection voltage of the output voltage Vout to the control circuit 11.

The control circuit 11 controls the on-off operations of the primary switching element Q so that the output voltage Vout, which is output based on the detection voltage from the secondary circuit 3, has a stable set voltage value. In FIG. 9, N1' denotes a primary winding and reference numeral 20 denotes a diode.

As described above, the switching power supply apparatus shown in FIG. 9 performs stabilization control on the output voltage Vout of the secondary circuit 3 by causing the detection circuit 12 to indirectly detect the output voltage Vout of the secondary circuit 3, and by causing the control circuit 11 to perform switching control of the primary switching element Q based on the detection voltage.

However, in the circuit shown in FIG. 9, since the switching power supply apparatus is constructed such that the output voltage Vout of the secondary circuit 3 is indirectly detected, there has been a problem that the output voltage Vout deviates from a set output voltage value Vsp because of a change of the input voltage Vin.

This problem may arise for the following reasons. For example, there is a case in which the number of turns of the secondary winding N2 and that of the tertiary winding N3 are different. In this case, a voltage induced across the secondary winding N2 and a voltage induced across the tertiary winding N3 are different. Therefore, it is necessary to use devices individually having various different characteristics, such as an endurance voltage, a forward voltage, and a reverse current, as the diodes 6 and 7 of the secondary circuit 3 and the diodes 13 and 14 of the detection circuit 12. Even when the number of turns of the secondary winding N2 and that of the tertiary winding N3 are the same, in the same manner as described above. there are some cases in which devices having various different characteristics are used as the diodes 6, 7, 13, and 14.

When the input voltage Vin is changed, for example, the reverse current of each of the diodes 6, 7, 13, and 14 is changed. When the characteristics of each of the diodes 6, 7, 13, and 14 are different, differences in changes of the reverse currents occur among the diodes 6, 7, 13, and 14.

For example, when the input voltage Vin has a voltage value "a", circuit constants of the control circuit 11 and the like are supposed to be set so that the output voltage Vout having the set output voltage value Vsp is stably output in accordance with switching control operations of the control circuit 11 based on the detection voltage of the detection circuit 12. Even though the control circuit 11 is formed as such, when the input power supply 5 supplying the input voltage Vin having a voltage value "b", which is different from the voltage value "a", is connected to the primary circuit 2, concerning a case in which the input voltage Vin has the voltage value "a" and a case in which the input voltage Vin has the voltage value "b", there is a deviation between the detection voltages of the detection circuit 12 to the output voltage Vouts in accordance with a difference in the change of the reverse current of each of the diodes in response to the change of the input voltage Vin.

Since the control circuit 11 controls the on-off operations of the primary switching element Q based on the detection voltage, the output voltage Vout is obtained having a voltage value which deviates from the set output voltage value Vsp. Therefore, the output voltage Vout having the set output voltage value Vsp cannot be stably output.

As the input voltage Vin increases, the deviation of the detection voltage of the detection circuit 12 to the output voltage Vout increases. Therefore, as indicated by the dashed lines in FIG. 2 and FIG. 4, the greater the input voltage Vin becomes, the greater the deviation of the output voltage Vout to the set output voltage value Vsp becomes.

Recently, the operating voltages in ICs and LSIs tend to be lower, and lowvoltage driven and high-current outputs are demanded. Because of this demand, there are some cases in which, instead of the diodes 6, 7, 13, and 14, a synchronous rectifier, such as a power MOS-FET, is used. In this case, when the input voltage Vin is changed, the drive voltage of the synchronous rectifier is changed, and the resistance of the on-resistor of the synchronous rectifier is changed, whereby the voltage drop of the synchronous rectifier is changed. Likewise, because of this, there arises a problem in that the output voltage Vout cannot be stably output due to the change of the input voltage Vin.

SUMMARY OF THE INVENTION

The present invention is made to solve the foregoing problems, and an object of the present invention is to provide a switching power supply in which an output voltage having a set voltage value can be stably output regardless of changes in the input voltage.

To achieve the foregoing objects, this invention provides a method for solving the above problems using the construction described below. That is, a first aspect of the invention provides a method for solving the above problems using a construction in which in a switching power supply apparatus is provided for outputting a voltage from the secondary winding of a transformer based on an input voltage in accordance with on-off operations of a primary switching element, and for rectifying, smoothing, and outputting the voltage by an output circuit; the switching power supply apparatus including a tertiary winding provided in the transformer; a detection circuit in which the output voltage output from the output circuit is indirectly detected using the tertiary winding, and the detected voltage is output; a compensating-voltage-superposition circuit which generates a compensating voltage, in accordance with the detection voltage, for compensating for a deviation of the detection voltage of the detection circuit to the output voltage of the output circuit in accordance with a change of the input voltage and which superposes the compensating voltage on the detection voltage output from the detection circuit; and a control circuit which controls the on-off operations of the primary switching element so that the output voltage of the output circuit is stabilized based on the detection voltage having the compensating voltage superposed thereon.

A second aspect of the invention is the provision of a switching power supply apparatus according to the first aspect of the invention and is constructed such that the compensating-voltage-superposition circuit generates the compensating voltage using a voltage output from the tertiary winding and superposes the compensating voltage on the detection voltage of the detection circuit.

A third aspect of the invention is the provision of the switching power supply apparatus according to the first aspect of the invention and is constructed such that the transformer is provided with a compensating-voltage-generation winding, and the compensating-voltage-superposition circuit generates the compensating voltage using a voltage output from the compensating-voltage-generation winding and superposes the compensating voltage on the detection circuit of the detection circuit.

According to this invention, in a case in which a switching power supply apparatus is constructed in which an output voltage is indirectly detected, since the device is constructed such that the compensating-voltage-superposition circuit is provided, the device generates a compensating voltage for compensating for a deviation of the detection voltage to the output voltage in accordance with the input voltage, performs compensation for the detection voltage by superposing this compensating voltage on the detection voltage, and applies the compensated detection voltage to a control circuit. The control circuit can thereby perform stabilization control of the output voltage so that the output voltage having a set voltage value is stably output based on the compensated detection voltage.

Thus, even though the input voltage may change, the output voltage having the set voltage value can be stably output without adverse influences of the changes of the input voltage, which enables the reliability of the switching power supply apparatus to be considerably improved.

In a switching device having a construction in which the compensating-voltage-superposition circuit generates the compensating voltage using a voltage across the tertiary winding, the compensating voltage can be output without more turns in the transformer. Therefore, an increase in the number of parts can be avoided.

In a switching device having a construction in which the transformer is provided with a compensating-voltage-generation winding, and the compensating-voltage-superposition circuit generates the compensating voltage using a voltage across the compensating-voltage-generation winding, since a voltage across the compensating-voltage-generation winding is sufficient to be generated in accordance with the input voltage, the voltage across the compensating-voltage-generation winding may be below the voltage across the tertiary winding. Compared with a case in which the voltage across the tertiary winding is used, reducing the voltage across the compensating-voltage-generation winding so that it is smaller than the voltage across the tertiary winding can decrease power consumption occurring in the compensating-voltage-superposition circuit. Because of this, the compensating-voltage-superposition circuit is constituted using low-voltage-endurance parts, which can prevent conductive loss in the compensating-voltage-superposition circuit from occurring. Therefore, reduction of the circuit efficiency of the switching power supply apparatus can be avoided.

For the purpose of illustrating the invention, there is shown in the drawings several forms which are presently preferred, it being understood, however, that the invention is not limited to the precise arrangements and instrumentalities shown.

BRIEF DESCRIPTION OF THE DRAWING(S)

DETAILED DESCRIPTION OF EMBODIMENTS OF THE INVENTION

Hereinafter, the preferred embodiments of the present invention are explained in detail with reference to the drawings.

Figure 1:
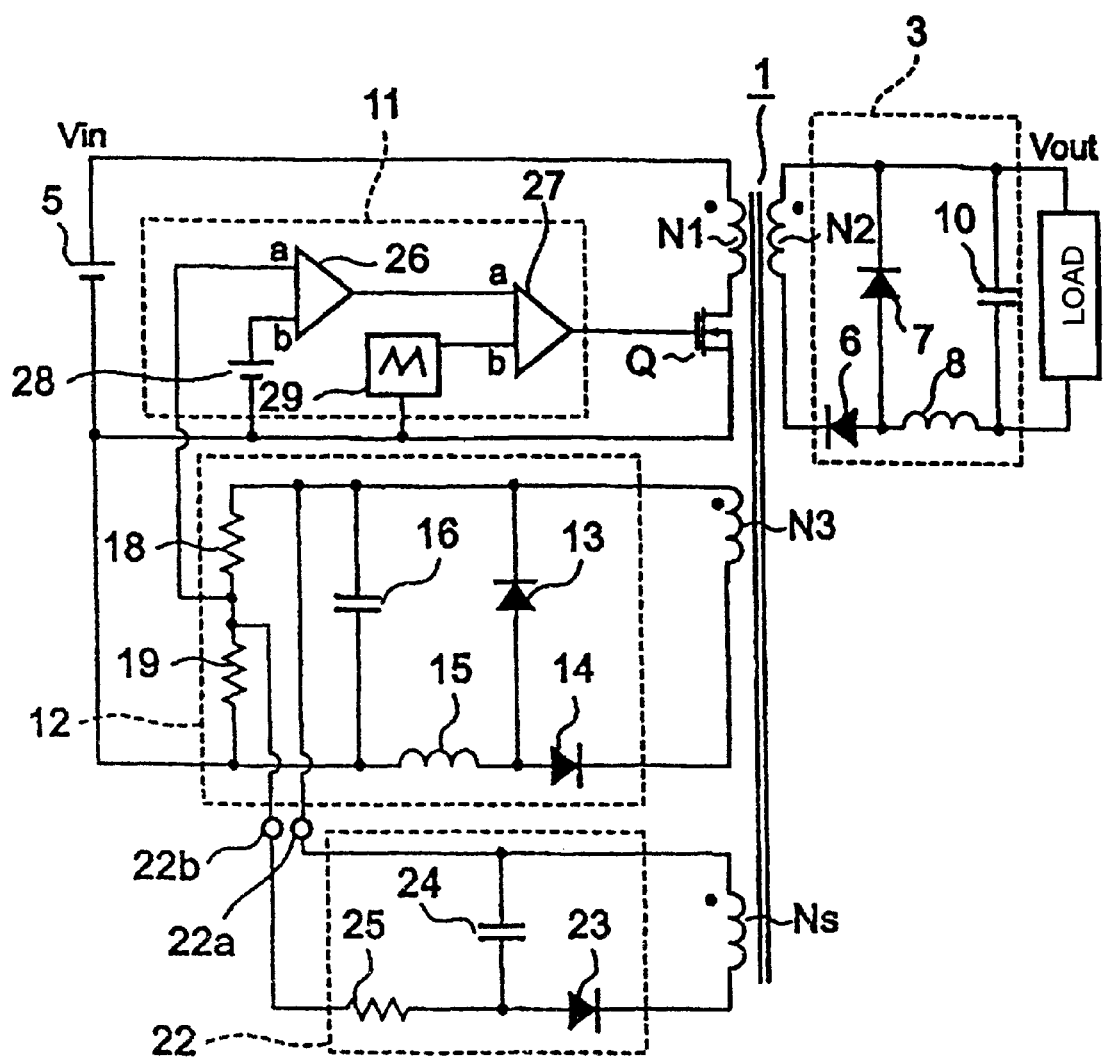
FIG. 1 is a circuit diagram showing the basic circuit construction of a switching power supply apparatus in a first embodiment.

FIG. 1 shows a basic circuit construction of a forward converter provided in the switching power supply apparatus according to the first embodiment.

Figure 9:
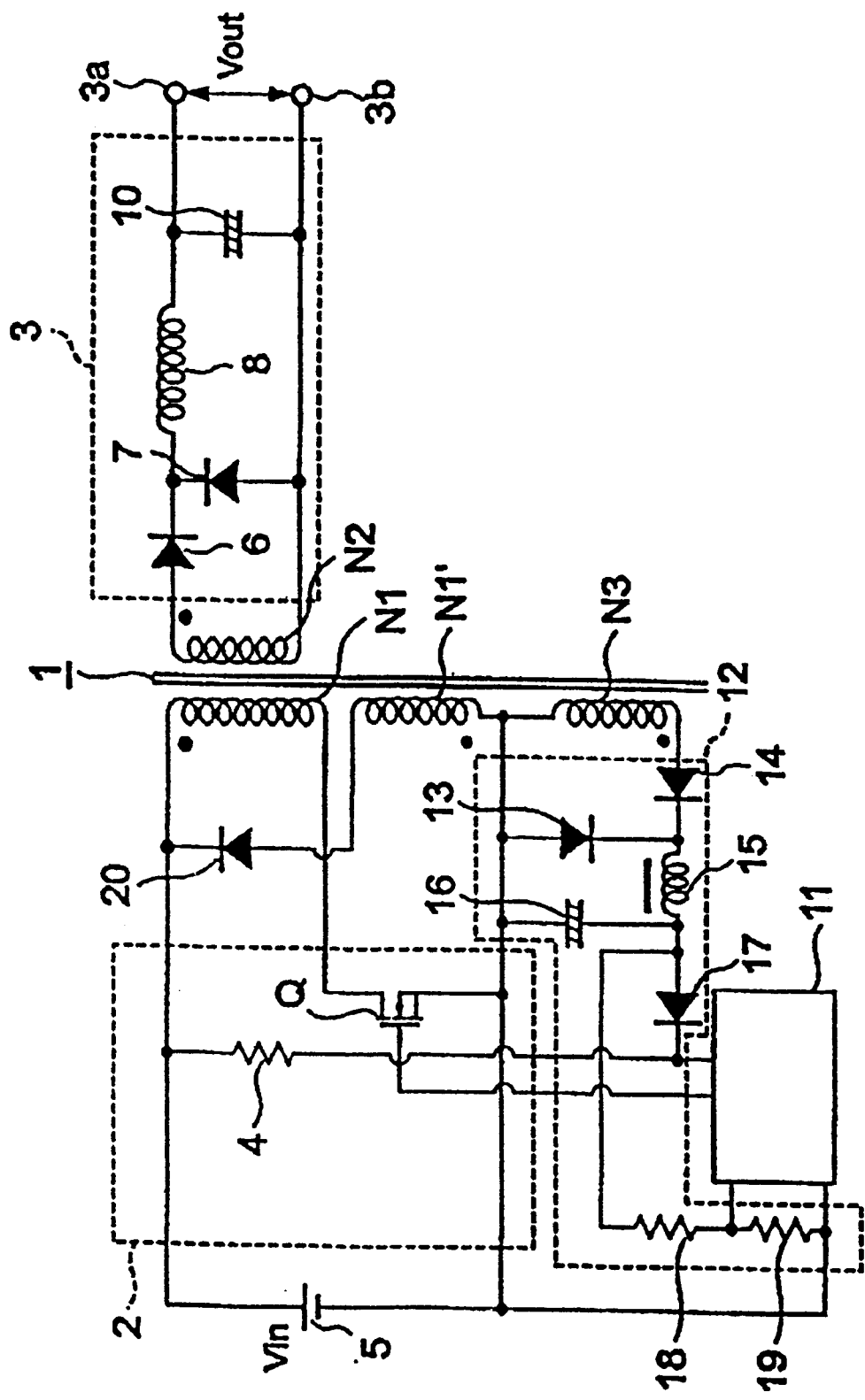
FIG. 9 is a circuit diagram showing a conventional example.

Characteristic features of this first embodiment are that, as shown in FIG. 1, a compensating-voltage-generation winding Ns and a compensating-voltage-superposition circuit 22 are provided. Otherwise, the construction of the switching power supply apparatus is substantially identical to that shown in FIG. 9. In this first embodiment, elements which are identical to corresponding elements in FIG. 9 have the same reference numerals. The repeated-descriptions of identical elements are omitted.

Figure 2:
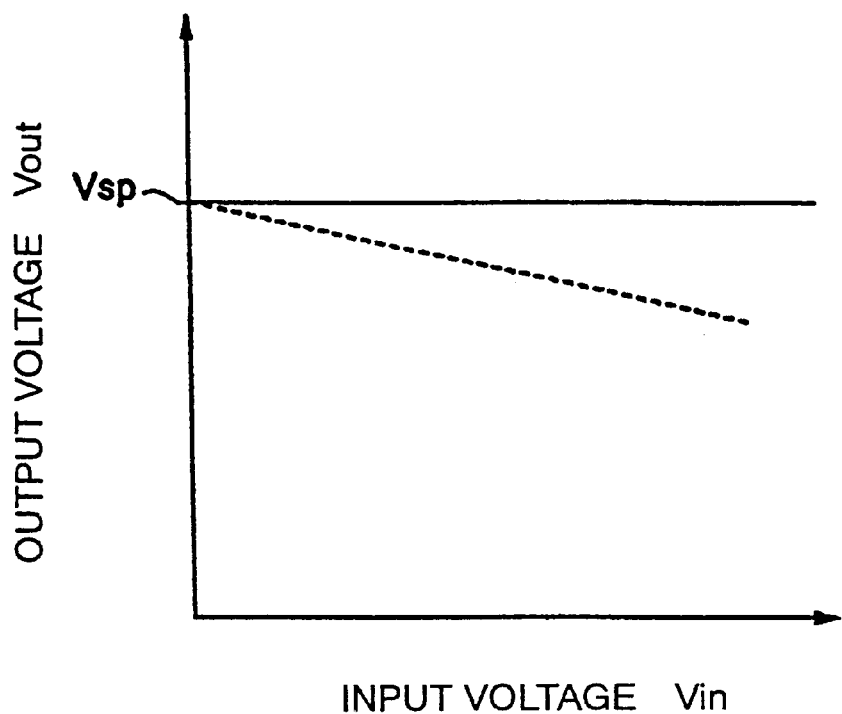
FIG. 2 is a graph showing a relation shape between an input voltage Vin and an output voltage Vout.

If the compensating-voltage-generation winding Ns and the compensating-voltage-superposition circuit 22 were not assumed to be provided in the circuit shown in FIG. 1, it is observed that the detection voltage of the detection circuit 12 to the output voltage Vout of the secondary circuit 3 would upwardly deviate due to a change of the input voltage Vin based on a variety of predetermined circuit conditions, such as characteristics such as, for example, the forward voltage characteristic of each of the diodes 6 and 7 of an output circuit, i.e., the secondary circuit 3, and the diodes 13 and 14 of the detection circuit 12; the strength of the coupling of the secondary winding N2 to the primary winding N1; and the strength of the coupling of the tertiary winding N3 to the primary winding N1. If an unmodified detection voltage of the detection circuit 12 were applied to the control circuit 11, as indicated by the dashed line in FIG. 2, in accordance with the switching control operations of the primary switching element Q caused by the control circuit 11, the voltage value of the output voltage Vout would deviate downward from the set voltage value Vsp as the input voltage Vin becomes greater. Accordingly, a problem may arise in that the output voltage Vout having the set voltage value Vsp cannot be produced.

Therefore, to prevent the foregoing problems, the compensating-voltage-generation winding Ns and the compensating-voltage-superposition circuit 22 are provided in this first embodiment. That is, as shown in FIG. 1, the transformer 1 is provided with the compensating-voltage-generation winding Ns in which a voltage corresponding to the input voltage Vin is generated.

The compensating-voltage-superposition circuit 22 is constructed by including a diode 23, a capacitor 24, and a resistor 25 in which the cathode of the diode 23 is connected to one end of the compensating-voltage-generation winding Ns, one end of the capacitor 24 is connected to the other end of this compensating-voltage-generation winding Ns, and the other end of this capacitor 24 is connected to the anode of the diode 23.

A connection part between the compensating-voltage-generation winding Ns and the capacitor 24, and an output end 22a of the compensating-voltage-superposition circuit 22 establish a conductive connection. The anode of the diode 23 is connected to one end of the resistor 25, and the other end of this resistor 25 is conductive-connected to an output end 22b of the compensating-voltage-superposition circuit 22.

In the compensating-voltage-superposition circuit 22 having the above-described construction, the voltage generated across the compensating-voltage-generation winding Ns is rectified and smoothed by the diode 23 and the capacitor 24. This rectified and smoothed voltage is dropped by the resistor 25 to a compensating voltage described below. In other words, the resistor 25 has a resistance which enables the rectified and smoothed voltage to be dropped to the compensating voltage.

The compensating voltage is a voltage which compensates for the deviation of the detection voltage of the detection circuit 12 to the output voltage Vout in accordance with the change of the input voltage Vin. Since the voltage is generated across the compensating-voltage-generation winding Ns in accordance with the input voltage Vin, the compensating-voltage-superposition circuit 22 can generate the compensating voltage using the voltage across the compensating-voltage-generation winding Ns.

In this first embodiment, as described above, since the detection voltage of the detection circuit 12 relating to the output voltage Vout deviates upwardly due to the change of the input voltage Vin, the compensating-voltage-superposition circuit 22 is connected to the detection circuit 12 so that the upward deviation can be compensated for by the compensation voltage. That is, as shown in FIG. 1, in order to cause the compensating voltage to drop the detection voltage of the detection circuit 12, the output end 22a of the compensating-voltage-superposition circuit 22 is connected to a connection part between the voltage-dividing resistor 18 and the capacitor 16, and the output end 22b is connected to a connection part between the voltage-dividing resistors 18 and 19.

Thus, since the connection between the compensating-voltage-superposition circuit 22 and the detection circuit 12 leads to the superposition of the compensating voltage of the compensating-voltage-superposition circuit 22 to the detection voltage of the detection circuit 12, the upward deviation of the detection voltage to the output voltage Vout in accordance with the input voltage Vin is compensated for. The compensated for detection voltage is supplied to the control circuit 11.

In the example shown in this FIG. 1, the control circuit 11 is constructed by including an error amplifier 26, a comparator 27, a standard voltage source 28, and a triangular wave generation circuit 29. The on-off operations of the primary switching element Q is controlled so that the output voltage Vout having the set voltage value Vsp is stably output based on the detection voltage superposed by the compensating voltage. Since operations of each of the error amplifier 26, the comparator 27, and the standard voltage source 28 are known, descriptions thereof are omitted.

According to this first embodiment, since the switching power supply apparatus has a construction in which the compensating voltage for compensating for the deviation of the detection voltage to the output voltage Vout is generated in accordance with the input voltage Vin, the detection voltage is compensated for by the superposition of the compensating voltage to the detection voltage, and this compensated detection voltage is output to the control circuit 11. Even though the input voltage Vin may change, as indicated by the solid line in FIG. 2, the output voltage Vout having the set voltage value Vsp can be stably applied to the load without adverse influences.

Also, according to this first embodiment, since the switching power supply apparatus is constructed so that the output voltage Vout is indirectly detected, the number of parts thereof can be reduced compared to a case in which it is constructed so that the output voltage Vout is directly detected. Moreover, since the circuit which indirectly detects the output voltage Vout can be constructed without expensive parts, there can be obtained an advantage in that the cost of the circuit can be reduced.

Furthermore, since the voltage across the compensating-voltage-generation winding Ns is sufficient to be generated in accordance with the input voltage Vin, it may be low. That is, a low number of turns of the compensating-voltage-generation winding Ns is sufficient, which can prevent the transformer 1 from being large. In addition, since the compensating-voltage-superposition circuit 22 has a small number of parts and a simple circuit construction, the switching power supply apparatus can be prevented from being large.

Furthermore, since, as described above, the voltage supplied from the compensating-voltage-generation winding Ns to the compensating-voltage-superposition circuit 22 is sufficient to be low, the compensating-voltage-superposition circuit 22 can be constructed using low-voltage-endurance parts. Accordingly, the conductive loss in the compensating-voltage-superposition circuit 22 can be suppressed by use of the low-voltage-endurance parts, which prevents the circuit efficiency of the switching power supply apparatus from being worsened.

Hereinafter a second embodiment is described. In the description of this second embodiment, elements which are identical to corresponding elements in the first embodiment have the same reference numerals. The repeated-descriptions of identical elements are omitted.

Figure 3:
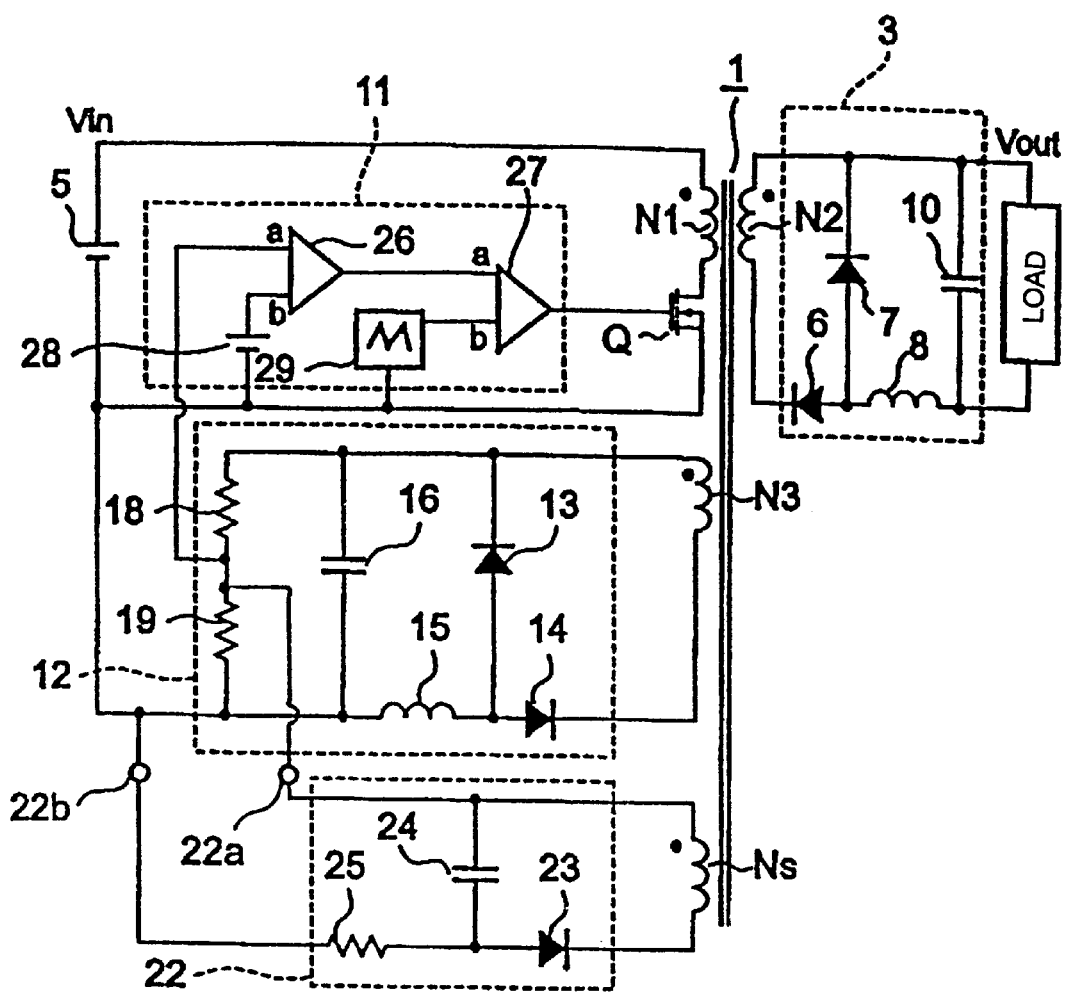
FIG. 3 is a circuit diagram showing the basic circuit construction of a switching power supply apparatus in a second embodiment.

Characteristics which distinguish the first embodiment from the second embodiment are that, as shown in FIG. 3, the output end 22a of the compensating-voltage-superposition circuit 22 is connected to the connection part between the voltage-dividing resistors 18 and 19, and the output end 22b is connected to a connection part between the voltage-dividing resistor 19 and the smoothing capacitor 16. Otherwise, the construction thereof is the same as the construction according to the first embodiment.

In this second embodiment, if the compensating-voltage-generation winding Ns and the compensating-voltage-superposition circuit 22 were not provided, and if the unmodified detection voltage of the detection circuit 12 were applied to the control circuit 11, the detection voltage to the output voltage Vout would deviate downwardly due to a change of the input voltage Vin. Because of this deviation, there would arise a problem in that the output voltage Vout deviates upwardly from the set voltage value Vsp, as indicated by the dashed line in FIG. 4.

Therefore, in this second embodiment, to avoid the above problem, the compensating-voltage-generation winding Ns and the compensating-voltage-superposition circuit 22 are provided in the same manner as in the first embodiment. The output ends 22a and 22b of the compensating-voltage-superposition circuit 22 are connected to one of the ends, respectively, of the voltage-dividing resistor 19 of the detection circuit 12, as described above. That is, the compensating-voltage-superposition circuit 22 is connected to the detection circuit 12 so that the compensating voltage of the compensating-voltage-superposition circuit 22 raises the detection voltage of the detection circuit 12, whereby the deviation is compensated for.

Thus, the compensating-voltage-superposition circuit 22 is connected to the detection circuit 12, which superposes the compensating voltage on the detection voltage. Because of this, the deviation of the detection voltage to the output voltage Vout is compensated for in accordance with the input voltage Vin, and this compensated for detection voltage is applied to the control circuit 11.

Figure 4:
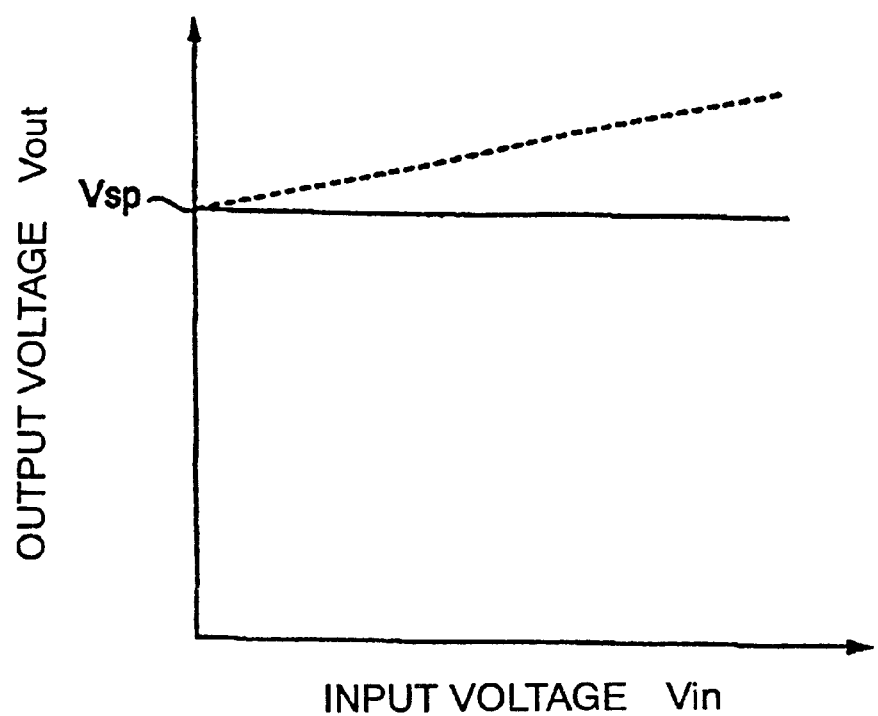
FIG. 4 is a graph showing another relationship between the input voltage Vin and the output voltage Vout, which is different from that shown in FIG. 2.

According to this second embodiment, since the switching power supply apparatus is constructed such that the compensating-voltage-superposition circuit 22 is provided; this compensating-voltage-superposition circuit 22 generates the compensating voltage to compensate for the downward deviation of the detection voltage of the detection circuit 12 to the output voltage Vout; it compensates for the detection voltage by superposing this compensated for voltage to the detection voltage of the detection circuit 12; and the superposition of this compensated detection voltage is applied to the control circuit 11, in the same manner as in the first embodiment, as indicated by the solid line in FIG. 4, regardless of the change of the input voltage Vin, the output voltage Vout having the set voltage value Vsp can be stably output without adverse influence due to the change of the input voltage Vin.

Hereinafter, a third embodiment is described. In this third embodiment, characteristic features about this third embodiment are that the switching power supply apparatus is constructed in which the reduction of the number of the parts thereof is achieved by the omission of the compensating-voltage-generation winding Ns shown in the first embodiment or the second embodiment. Otherwise, the construction thereof is the same as the construction according of the above embodiments. Elements identical to corresponding elements in each of the above embodiments have the same reference numerals. The repeated descriptions of identical elements are omitted.

Figure 5A:
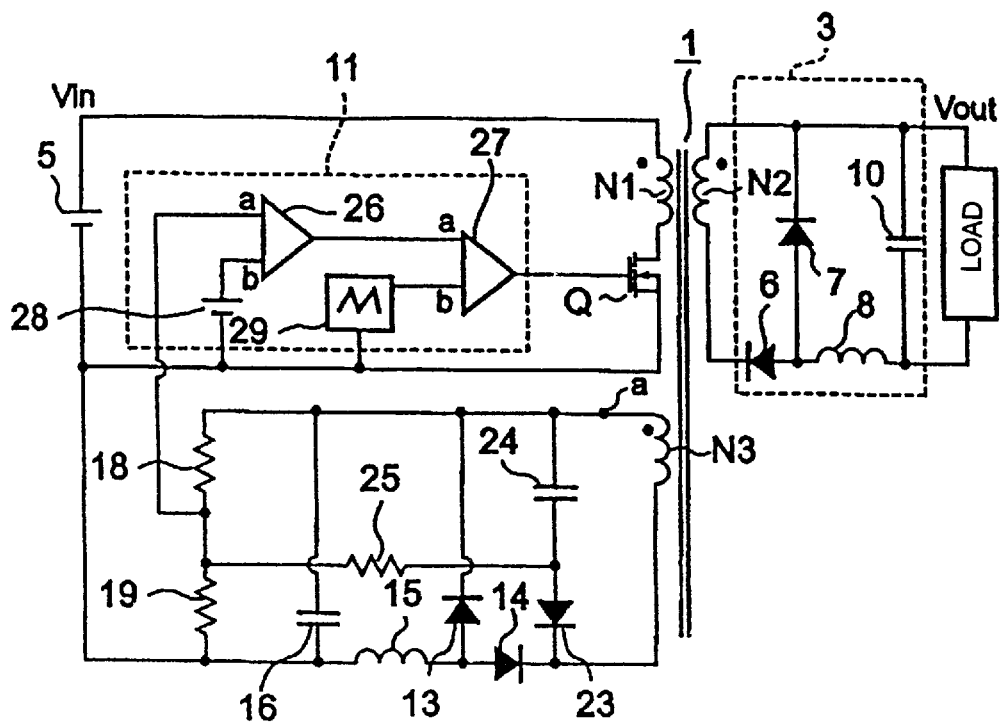
FIGS. 5A and 5B are circuit diagrams showing a third embodiment which prevents the output voltage Vout from rising above a set voltage value Vsp in accordance with the input voltage Vin.
Figure 6A:
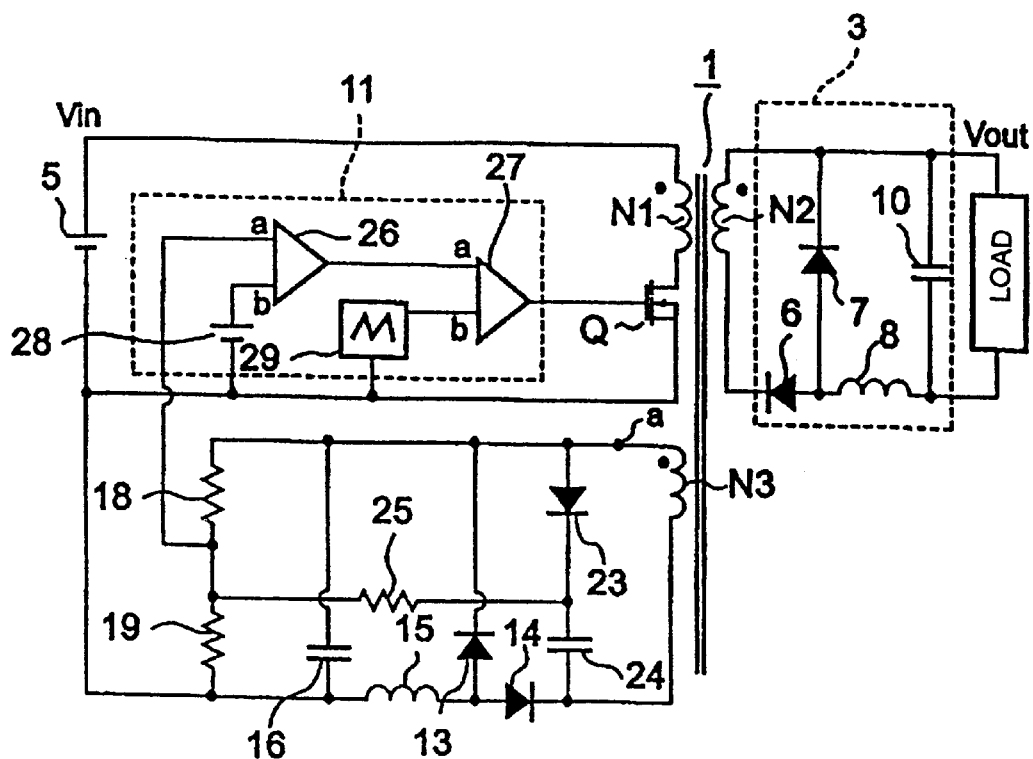
FIGS. 6A and 6B are circuit diagrams showing the third embodiment which prevents the output voltage Vout from lowering to below the set voltage value Vsp in accordance with the input voltage Vin.

In this third embodiment, as shown in FIG. 5A and FIG. 6A, a switching power supply apparatus is constructed in which the above-described compensating-voltage-generation winding Ns is omitted; the compensating-voltage-superposition circuit 22 including the diode 23, the capacitor 24, and the resistor 25 is connected to the tertiary winding N3; and the compensating-voltage-superposition circuit 22 generates the compensating voltage using the voltage generated across the tertiary winding N3 and superposes this compensated for voltage on the detection voltage of the detection circuit 12.

The circuit shown in FIG. 5A is a variation in which the compensating-voltage-generation winding Ns is omitted from the circuit in FIG. 1 shown in the first embodiment, and the compensating-voltage-superposition circuit 22 is connected to the tertiary winding N3. The circuit shown in FIG. 6A is a variation in which the compensating-voltage-generation winding Ns is omitted from the circuit in FIG. 3 shown in the second embodiment, and the compensating-voltage-superposition circuit 22 is connected to the tertiary winding N3.

In the circuit example shown in FIG. 5A, the diode 23 and the capacitor 24, which constitute the compensating-voltage-superposition circuit 22, establish a series connection between the anode of the diode 23 and the capacitor 24. This series connection part, constituted by the diode 23 and the capacitor 24, is connected to the tertiary winding N3 in parallel so that the capacitor 24 is connected to the end "a" of the tertiary winding N3. The connection part between the diode 23 and the capacitor 24 is connected to one end of the resistor 25, and the other end of this resistor 25 is connected to the connection part of the voltage-dividing resistors 18 and 19 of the detection circuit 12.

In the circuit example shown in FIG. 6A, the diode 23 and the capacitor 24, which constitute the compensating-voltage-superposition circuit 22, establish a series connection between the cathode of the diode 23 and the capacitor, and this series connection part is connected to the tertiary winding N3 in parallel so that the diode 23 is connected to the end "a" of the tertiary winding N3. In this respect, the circuit is different from the circuit shown in FIG. 5A; otherwise, it is identical to the circuit shown in FIG. 5A.

According to this third embodiment, since the compensating-voltage-superposition circuit 22 is provided in the same manner as in each of the above embodiments, the same advantages as obtained in each of the above embodiments can be achieved. Furthermore, since the compensating-voltage-superposition circuit 22 is constructed in which the compensating voltage is generated by use of the voltage generated across the tertiary winding N3, the compensating-voltage-generation winding Ns does not need to be provided. Because of this, a reduction in the number of parts can be achieved.

This invention is not limited to each of the embodiments, and can take various embodiment forms. For example, although the resistor 25 is provided in the compensating-voltage-superposition circuit 22 in each of the above embodiments, a variable resistor may be provided instead.

Figure 5B:
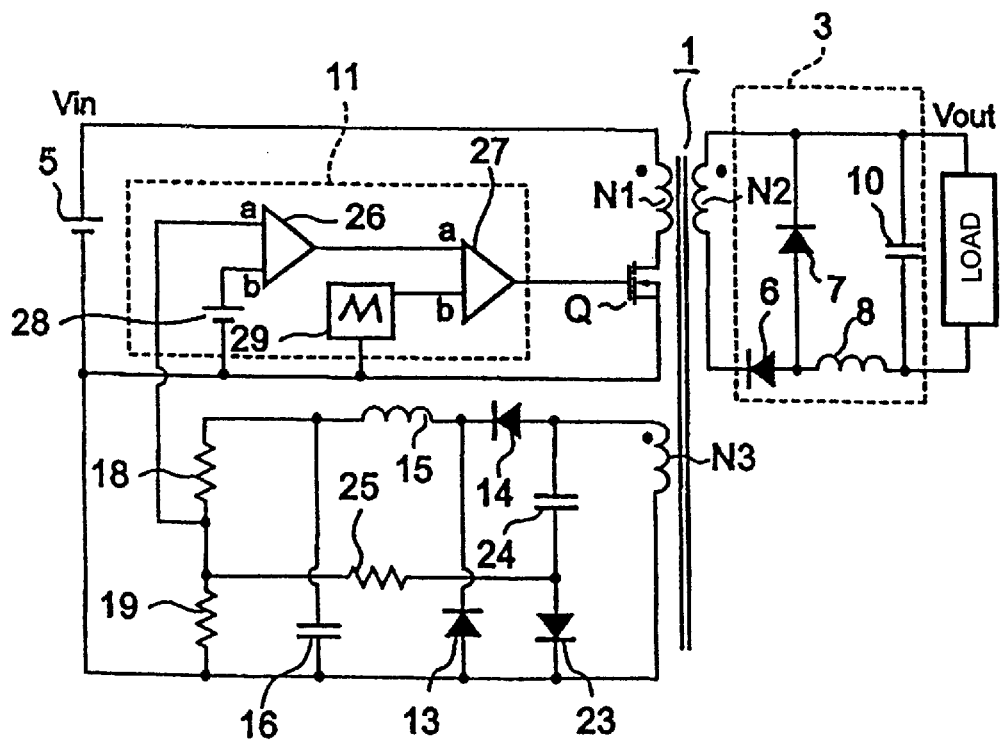
Figure 6B:
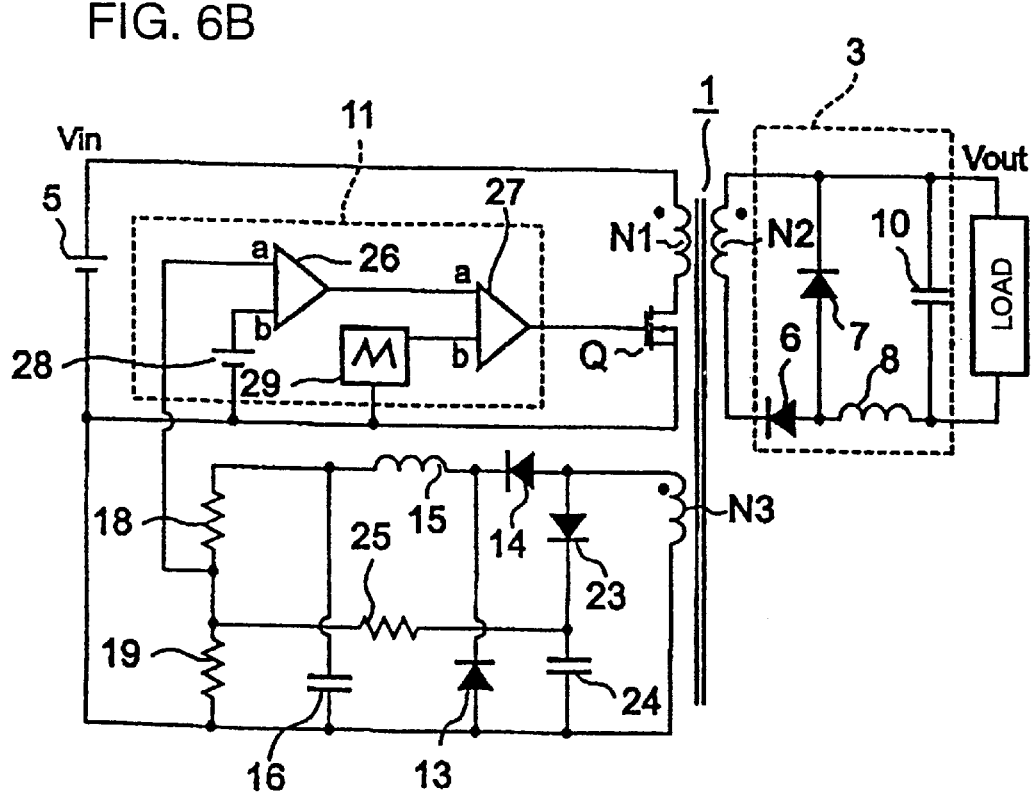
Figure 7A:
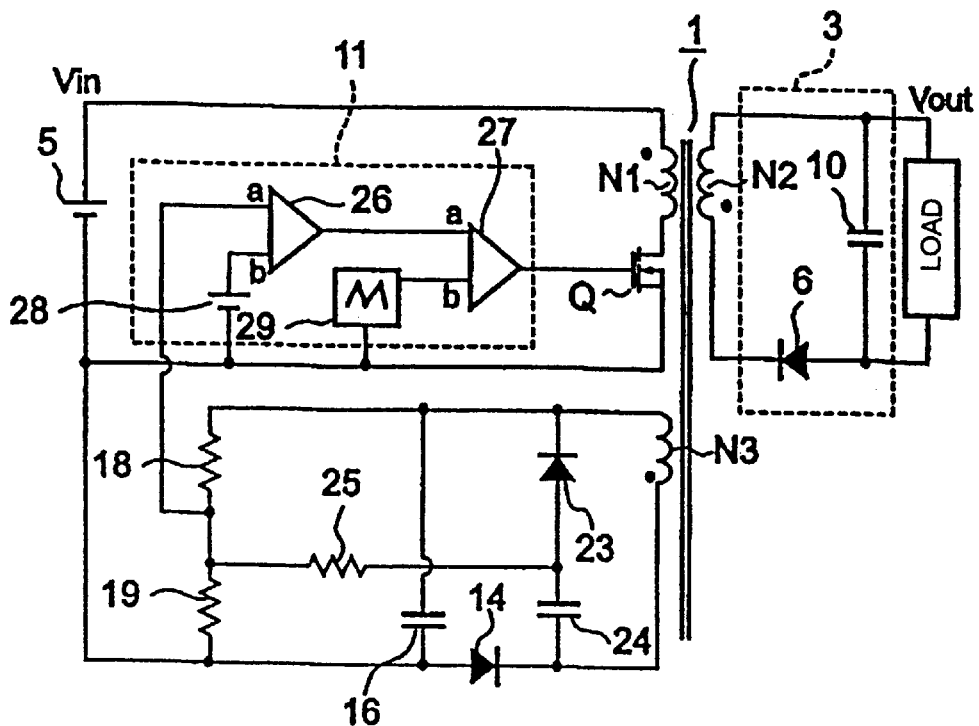
FIGS. 7A and 7B are circuit diagrams showing an embodiment in a case in which the present invention is applied to the switching power supply apparatus having a flyback converter incorporated therein.
Figure 7B:
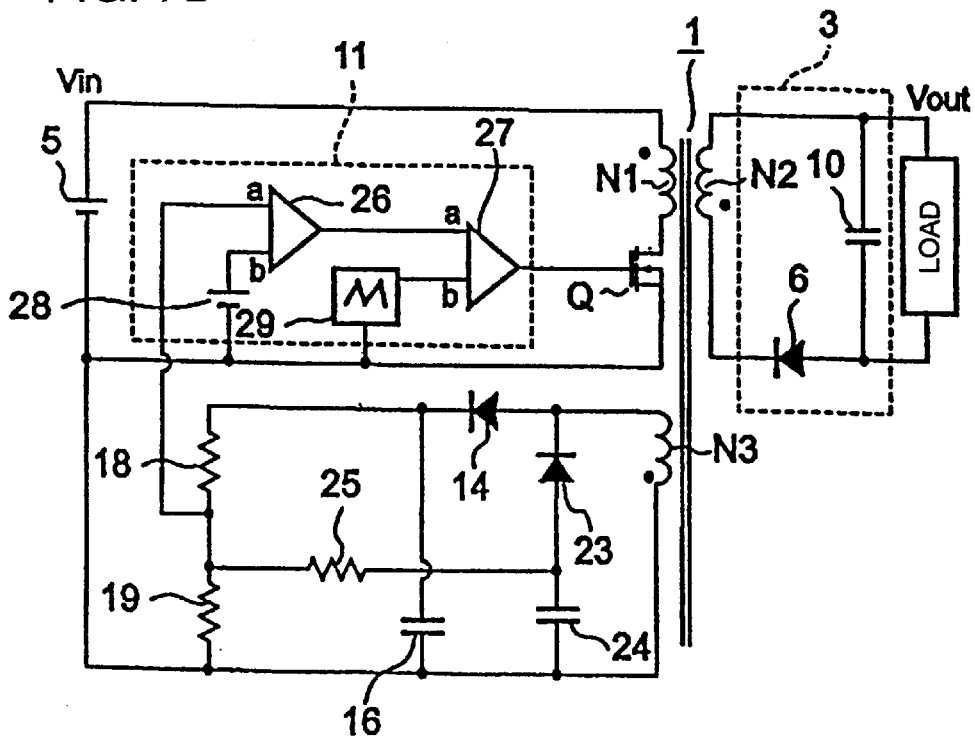

Although, in each embodiment, the detection circuit 12 is provided with a cathode-common type rectifier unit in which the cathodes of the diodes 13 and 14 are connected, the detection circuit 12 may be provided with an anode-common type rectifier unit in which the anodes of the diodes 13 and 14 are connected. For example, FIG. 5B shows a circuit example in a case in which an anode-common type detection circuit 12 is provided instead of the cathode-common type detection circuit 12 shown in FIG. 5A. FIG. 6B shows a circuit example in a case in which an anode-common type detection circuit 12 is provided instead of the cathode-common type detection circuit 12 shown in FIG. 6A.

In addition, although each embodiment is described as an example in a case in which a converter constituting a switching power supply apparatus is a forward converter, this invention may be applied to a switching power supply having a flyback converter incorporated therein.

For example, FIGS. 7A, 7B, 8A, and 8B individually show circuit examples in cases in which the present invention is applied to the switching power supply apparatus having the flyback converter incorporated therein. The circuits shown in FIGS. 7A and 7B have a circuit construction in which the output voltage Vout would deviate upwardly in accordance with the input voltage Vin, as indicated by the dashed line in FIG. 2, if the compensating-voltage-superposition circuit 22 were not provided therein. In the same manner as in each embodiment, the provision of the compensating-voltage-superposition circuit 22 constituted by the diode 23, the capacitor 24, and the resistor 25 can prevent the problem of the deviation of the output voltage Vout caused by the change of input voltage Vin. There are differences between the circuit in FIG. 7A and the circuit in FIG. 7B regarding the position of each diode 14 therein. Otherwise, the circuits are substantially identical.

Figure 8A:
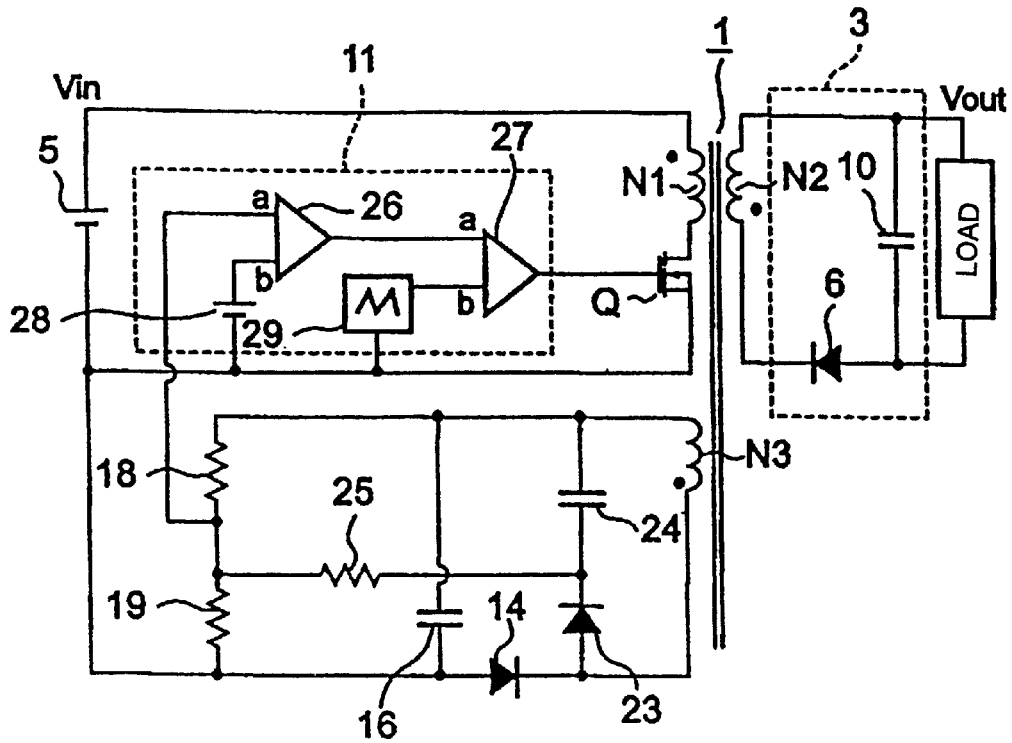
FIGS. 8A and 8B are circuit diagrams showing another embodiment in a case in which the present invention is applied to the switching power supply apparatus having the flyback converter incorporated therein.
Figure 8B:
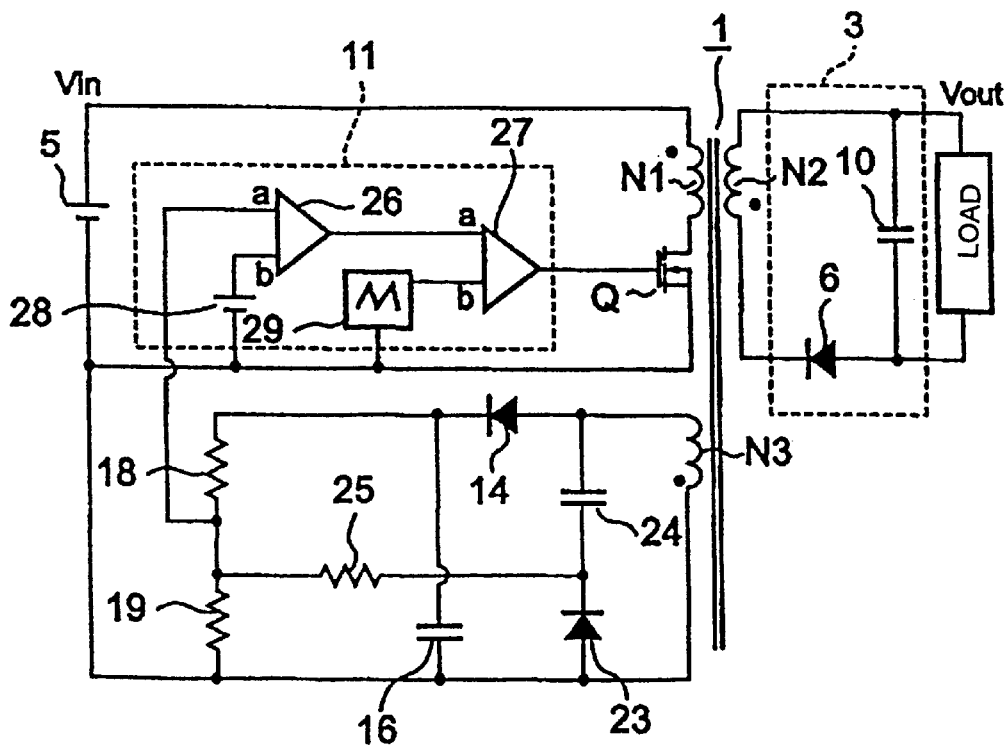

The circuits shown in FIGS. 8A and 8B have a construction in which the output voltage Vout would deviate downwardly in accordance with the input voltage Vin, as indicated by the dashed line in FIG. 4, if the compensating-voltage-superposition circuit 22 were not provided therein. In the same manner as in each embodiment, the provision of the compensating-voltage-superposition circuit 22 constituted by the diode 23, the capacitor 24, and the resistor 25 can prevent the problem of the deviation of the output voltage Vout caused by the change of input voltage Vin. There are differences between the circuit in FIG. 8A and the circuit in FIG. 8B regarding the position of each diode 14 therein. Otherwise, the circuits are substantially identical.

Although in the examples shown in FIGS. 7A, 7B, 8A, and 8B, the compensating-voltage-superposition circuit 22 generates the compensating voltage using the voltage across the tertiary winding N3, of course, the switching power supply apparatus provided with the flyback converter therein may be constructed in which the compensating-voltage-generation winding Ns is provided in the transformer 1, and the compensating-voltage-superposition circuit 22 generates the compensating voltage using the voltage across the compensating-voltage-generation winding Ns.

Furthermore, a synchronous rectifier, such as a MOSFET, may be used instead of the diodes 6 and 7 of the secondary circuit 3 and the diodes 13 and 14 of the detection circuit 12 shown in each embodiment. In this case, in the same manner as in each embodiment, there can be obtained an advantage in that the output voltage Vout can be stably output regardless of the change of the input voltage Vin.

Although the above embodiments show a DC-DC converter, in which the converter is incorporated in the switching power supply, this invention may be applied to a switching power supply apparatus having an AC-DC converter incorporated therein.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A switching power supply apparatus comprising:
    a transformer having a primary winding, a secondary winding and a tertiary winding;
    a primary switching element connected to the primary winding of the transformer for providing the primary winding with an input voltage in accordance with an on-off operation of the main switching element;
    an output circuit connected to the secondary winding of the transformer for receiving a voltage based on the input voltage from the secondary winding, rectifying the voltage and outputting an output voltage;
    a detection circuit in which the output voltage output from the output circuit is indirectly detected by sensing an output from the tertiary winding, and a detection voltage is output;
    a compensating-voltage-superposition circuit which generates a compensating voltage, in accordance with the detection voltage, for compensating a deviation of the detection voltage of the detection circuit to the output voltage of the output circuit in accordance with a change of the input voltage and which superposes the compensating voltage on the detection voltage output from the detection circuit; and
    a control circuit which controls the on-off operation of the primary switching element so that the output voltage of the output circuit is stabilized based on the detection voltage having the compensating voltage superposed thereon.

2. The switching power supply apparatus of claim 1, wherein the compensating-voltage-superposition circuit provides the compensating voltage using a voltage output from the tertiary winding and the compensating voltage is superposed on the detection voltage of the detection circuit.

3. The switching power supply apparatus of claim 1, wherein the transformer is provided with a compensating-voltage-generation winding, and the compensating-voltage-superposition circuit generates the compensating voltage using a voltage output from the compensating-voltage-generation winding and superposes the compensating voltage on the detection voltage of the detection circuit.

4. The switching power supply apparatus of claim 1, wherein, in the absence of the compensating voltage, the output voltage would tend to fall and the compensating voltage is superposed on the detection voltage so as to cause the output voltage to be stable.

5. The switching power supply apparatus of claim 1, wherein, in the absence of the compensating voltage, the output voltage would tend to rise, and the compensating voltage is superposed on the detection voltage so as to cause the output voltage to be stable.

6. The switching power supply apparatus of claim 1, wherein the compensating voltage superposition circuit comprises a rectifier and a capacitor coupled in series across a voltage source related to the output voltage.

7. The switching power supply apparatus of claim 6, wherein the voltage source comprises the tertiary winding.

8. The switching power supply apparatus of claim 6, wherein the voltage source comprises a compensating voltage generation winding of the transformer.

9. A method of controlling a switching power supply, the switching power supply comprising:

a transformer having a primary winding, a secondary winding and a tertiary winding;

a primary switching element connected to the primary winding of the transformer for providing the primary winding with an input voltage in accordance with an on-off operation of the main switching an output circuit connected to the secondary winding of the transformer for receiving a voltage based on the input voltage from the secondary winding, rectifying the voltage and outputting an output voltage; and a detection circuit, in which the output voltage output from the output circuit is indirectly detected by sensing an output from the tertiary winding, and a detection voltage is output; the method comprising:

generating a compensating voltage, in accordance with the detection voltage, for compensating a deviation of the detection voltage of the detection circuit to the output voltage of the output circuit in accordance with a change of the input voltage and superposing the compensating voltage on the detection voltage output from the detection circuit; and controlling the on-off operation of the primary switching element so that the output voltage of the output circuit is stabilized based on the detection voltage having the compensating voltage superposed thereon.

10. The method of claim 9, further comprising providing the compensating voltage using a voltage output from the tertiary winding and superposing the compensating voltage on the detection voltage of the detection circuit.

11. The method of claim 9, wherein the transformer is provided with a compensating-voltage-generation winding, and further comprising generating the compensating voltage using a voltage output from the compensating-voltage-generation winding and superposing the compensating voltage on the detection voltage of the detection circuit.

12. The method of claim 9, wherein, in the absence of the compensating voltage the output voltage would tend to fall and superposing the compensating voltage on the detection voltage so as to cause the output voltage to be stable.

13. The method of claim 9, wherein, in the absence of the compensating voltage the output voltage, would tend to rise, and superposing the compensating voltage on the detection voltage so as to cause the output voltage to be stable.

* * * * *